United States Patent [19]

Choudin

[11] Patent Number: 4,727,096

[45] Date of Patent: Feb. 23, 1988

[54] THERMOSETTING RESINS REINFORCED WITH CUT YARNS

[75] Inventor: Claude Choudin, Saint-Alban Leysse, France

[73] Assignee: Vetrotex Saint-Gobain, Chambery, France

[21] Appl. No.: 920,347

[22] Filed: Oct. 16, 1986

[30] Foreign Application Priority Data

Oct. 30, 1985 [FR] France .................. 85 16124

[51] Int. Cl.$^4$ ............................................. C08K 7/14
[52] U.S. Cl. .................................... 523/217; 523/220; 523/222; 523/527
[58] Field of Search ............... 523/220, 222, 527, 217

[56] References Cited

U.S. PATENT DOCUMENTS

| | | | |
|---|---|---|---|
| 2,378,477 | 6/1945 | Hanley | 523/222 |
| 3,701,748 | 10/1972 | Kroekel | 260/40 |
| 3,702,276 | 11/1972 | Ward | 156/181 |
| 3,728,211 | 4/1973 | Ball et al. | 523/222 |
| 4,101,604 | 7/1978 | Rowe | 523/527 |
| 4,295,871 | 10/1981 | Droux et al. | 65/3.41 |
| 4,322,334 | 3/1982 | Arakawa et al. | 523/512 |
| 4,389,375 | 6/1983 | Proska et al. | 422/111 |
| 4,422,842 | 12/1983 | Monnet | 425/561 |
| 4,472,541 | 9/1984 | Sorensen et al. | 523/220 |
| 4,476,274 | 10/1984 | Liu | 523/527 |
| 4,574,108 | 3/1986 | Fakirov et al. | 523/222 |

FOREIGN PATENT DOCUMENTS 1201087 8/1970 United Kingdom .
1201088 8/1970 United Kingdom .
1367960 9/1974 United Kingdom .

*Primary Examiner*—Lewis T. Jacobs
*Attorney, Agent, or Firm*—Pennie & Edmonds

[57] ABSTRACT

The invention relates to a composition of polymerizable resins reinforced with cut yarns of different lengths, such as glass yarns, and a process for its production. This composition comprises at least a representative of each of the following constituents: an unsaturated polyester, a thermoplastic polymer, a monomer liquid substance having at least a polymerizable reactive $CH_2=C<$ group per molecule, an inert filler and optionally a thickening agent, a catalyst, an inhibitor and a releasing agent, the cut yarns being in the dispersed state in filament form for the longest ones, with the shortest yarns remaining in state of yarn formed from a multiplicity of filaments glued together. The process steps include making the mixture of the organic constituents and successively incorporating therein first the yarns previously coated with an insoluble lubricant, then the yarns coated with a lubricant which is soluble in the mixture. The compositions according to the invention may be used to make composite products by injection or compression molding.

20 Claims, No Drawings

THERMOSETTING RESINS REINFORCED WITH CUT YARNS

TECHNICAL FIELD

The present invention relates to a composition of polymerizable resins reinforced with cut yarns, such as glass yarns, intended for making objects obtained by molding, in particular by injection molding. The invention also relates to a process for making compositions of such polymerizable resins and yarns.

BACKGROUND ART

It is already known to use as a molding material compositions formed from a mixture of unsaturated polyester, a thermoplastic polymer, a monomer substance such as styrene to which is added a mineral filler, a catalyst, a stabilizer and a releasing agent, which exhibit a very slight, even zero, shrinkage after polymerization. The polyesters used to obtain this result are generally slightly saturated.

In numerous applications, the objects made from these compositions of polymerizable resins should exhibit good mechanical properties, in particular, good impact resistance. To do this, it is known to mix with these compositions cut yarns which most often are glass yarns.

These glass yarns are obtained by combining a large number of filaments, mechanically drawn from molten glass flowing from orifices made at the base of a spinneret heated by Joule effect. During drawing, these filaments are coated with a lubricant then gathered to give rise to a yarn exhibiting a certain cohesion. This continuous yarn is then cut into sections from a few millimeters to several dozen millimeters in length.

When the filaments are coated with a lubricant soluble in the composition of resins, the cut yarn introduced into said composition disintegrates and is dispersed in the filament state when the unit is mixed. On the other hand, if the filaments are coated with an insoluble lubricant the cut yarn introduced into the composition of resins remains integral, even at the end of the mixing operation.

In the first case, the element for reinforcing the final product is essentially the glass filament, in the second case it is the yarn formed from filaments that have remained glued to one another.

Depending on which type of reinforcement is involved, the flow of the mixture in the mold, and the degree of orientation of the glass fibers, the resulting mechanical properties and surface condition of the molded object can be varied over a wide range.

Thus, soluble lubricants are known for imparting to the object an excellent surface condition, a high tensile strength but a relatively mediocre impact resistance. The insoluble lubricants are well known for improving the impact resistance but to the detriment of the surface and tensile strength.

Taking into consideration the numerous factors that affect the qualities of the final product, one skilled in the art faces different situations which require, for example, to choose a better aptitude for molding to the detriment of physical properties, or to opt for an excellent surface condition to the detriment of the impact resistance and vice versa.

In a particular case, one skilled in the art has succeeded in reconciling a good aptitude for molding, a high level of mechanical properties and an excellent surface condition of the final product. There is involved a process of producing plates of thermoplastic resins reinforced with glass fiber, described by the British Patent Specification No. 1,367,960.

This process consists in continuously making a mat of cut yarns, relatively long and remaining integral, on which is deposited a layer of much shorter cut yarns and greatly disintegrated to the filament state. The unit is simultaneously heated and compressed, which has the effect of causing a part of the short fibers in the filament state to penetrate between the long fibers remaining in the yarn state.

Although this patent discloses a particular association of fibers of different lengths, it does not suggest any valid way of obtaining a homogeneous mixture of resin and fibers of different lengths. Actually, this patent does not suggest any solution for obtaining such a mixture, while avoiding breaking of the fibers (especially the longer ones) caused by the shearing forces, which inevitably intervene during the kneading operation and during the molding operations, particularly when injection molding is performed.

DETAILED DESCRIPTION OF THE INVENTION

This invention has as its object a composition of polymerizable resins, homogeneously reinforced by a mixture of cut yarns of different lengths, which exhibit a very good aptitude for molding in general and which impart to the final product a set of mechanical characteristics superior to that of similar products now known, as well as an excellent surface condition.

The invention also has as its object a process for obtaining this composition of polymerizable resins, reinforced by a mixture of cut yarns of different lengths.

To achieve these objects, the composition of polymerizable resins according to the invention which comprises a resin of an unsaturated polyester, a thermoplastic polymer, a liquid monomer having at least one polymerizable reactive group $CH_2=C<$ per molecule, an inert mineral filler and, optionally, an active filler known as a thickening agent, a catalyst, a stabilizer and a releasing agent, and cut yarn reinforcement dispersed therein. The cut yarns are of different lengths, some being in the dispersed state in the form of simple filaments, while others are multiple filament yarn, wherein the filaments are glued or linked, wherein the filaments in the dispersed state are longer than the glued or linked filaments remaining in the yarn state.

Of the different constituents of the composition of the invention, the nature of the polyester used plays an important role because it will condition the polymerization process and the properties of the final product.

Thus, the polyesters described by French patent No. 1,530,817, which exhibit a molecular weight per carbon double bond of about 150 to 186, can be used to achieve the compositions of the present invention. Still, the best aptitude for molding of the paste of polymerizable resins and for taking the polymerized piece from the mold is obtained with an unsaturated aromatic polyester, whose molecular weight per carbon double bond is between 350 and 528, preferably between 350 and 438.

The processes for preparation of this latter type of polyester are well known. It can be prepared by condensing a dicarboxylic acid with ethylenic unsaturation in alpha, beta, or an anhydride or a mixture of these latter, and an acid or a phthalic anhydride or a mixture of them with a dialcohol or mixture of dialcohols.

Thus, it is possible to use maleic, fumaric, citraconic, chloromaleic, orthophthalic, isophthalic, or terephthalic acids (or anhydrides).

The dialcohol (or mixture of dialcohols) used can be selected from the following compounds: ethylene glycol, propylene glycol, dipropylene glycol, 1,3-butanediol and neopentyl glycol. A thermoplastic polymer will be added to this polyester in a manner which is known in the art. It is preferable to use a polymer soluble in the polyester resin which makes it possible to easily obtain a homogeneous mixture. These polymers are well known: they are, for example, homopolymers of vinyl acetate, methyl methacrylate, styrene or copolymers of methyl methacrylate and styrene or styrene and acrylonitrile.

It is also possible to add an insoluble polymer such as polyethylene or polyvinyl chloride.

In certain applications, in particular for those that use the injection molding process, the ratio of proportions by weight according to which the unsaturated polyester and thermoplastic polymer are introduced has a considerable influence on the results obtained.

The composition of polymerizable resins gives the best results when the weight ratio of thermoplastic polymer/unsaturated polyester remains between about 0.5 and 0.8.

The composition of the invention also contains a liquid monomer or a mixture of monomers having at least one polymerizable reactive group $CH_2=C<$ per molecule.

This liquid monomer should be able to copolymerize with the aromatic polyester to form a cross-linked polymer. This liquid monomer is preferably styrene, but other liquid monomers whose use is also well known in similar circumstances, can be selected by one skilled in the art.

The composition of the invention further comprises an inert mineral filler such as calcium carbonate, calcium silicate or silica: lightened fillers such as expanded vermiculite or glass microspheres can also be used.

The composition of the invention can optionally comprise an active mineral filler, currently called a thickening agent. This agent is generally used to increase the viscosity of the mixture. Preferably, it is selected from the following constituents: magnesium or calcium oxide or hydroxide.

Polymerization catalysts, oxidation inhibitors which prevent prepolymerization of the composition during storage, as well as releasing agents can also be introduced into the composition.

To the various preceding constituents, previously mixed, are added cut yarns of various lengths. The yarns used are generally glass yarns but other yarns can be used, since they are able to reinforce an organic matrix.

When glass yarns are involved, the length of the cut yarns used is generally between 6 and 25 millimeters and preferably between 13 and 25 millimeters.

The glass yarns are advantageously in the following forms: some consist of glass filaments coated with a lubricant exhibiting a great solubility in the mixture of organic constituents; this type of lubricant is described, for example, in French patent No. 2,398,702. Other yarns consists of glass filaments coated with a lubricant relatively insoluble in said mixture; this type of lubricant is described, for example, in U.S. Pat. Nos. 4,295,871 and 3,702,276. For simplification, these two categories of lubricants will be hereafter be called "soluble" and "insoluble."

Thus, the longer cut yarns going into the composition according to the invention will preferably be coated with a soluble lubricant, while the shortest ones will be coated with an insoluble lubricant.

For numerous objects and articles obtained by molding, in particular for body elements of motor vehicles, the best characteristics are obtained when the proportion by weight of the cut yarns coated with an insoluble lubricant, is greater than the proportion by weight of the long yarns coated with a soluble lubricant. The best results are obtained when the ratio of proportions by weight of long yarns/short yarns is between 0.6 and 0.7.

The compositions according to the invention cover a rather broad range of formulations defined from the following weight limits:

| | |
|---|---|
| unsaturated polyester | 13 to 20% |
| thermoplastic polymer | 10 to 15% |
| monomer | 0.01 to 2% |
| inert mineral filler | 40 to 55% |
| cut glass yarns | 15 to 25% |

When the composition is intended for an injection molding process, it is known to mix in a first stage the various organic constituents and the mineral filler, then, in a second stage, to add the cut yarns and proceed to a second mixing. This is generally performed in a mixer different from the one used for the first mixing.

This second operation is delicate because it can be the cause of deterioration of the glass yarns, and therefore of a reduction of the mechanical properties of the finished product. This deterioration is more or less rapid depending on whether the yarns are coated with a soluble or insoluble lubricant.

To preserve the properties of the final product better, the composition of the invention is prepared by the following process.

In a first phase, the various resin constituents (without the glass yarns) are mixed in a manner known in the art; in a second phase, cut glass yarns coated with an insoluble lubricant are mixed into this resin mixture and a new mixture is formed; in a third phase, cut yarns coated with a soluble lubricant are mixed into the preceding mixture, and the final composition is formed.

This process makes it possible to considerably reduce the degradation of the glass yarns, particularly when the percentage by weight of the long yarns is high, while assuring a good impregnation of the yarns by the organic constituents.

For the second and third phases, it is recommended to use a mixer other than the one used for the first phase. Mixers of the double Z arm type exhibit sufficient play between the wall of the vat and the arms to preserve the length of most of the glass fibers; turbulent system kneaders are also suitable.

The composition thus made is transferred into a hopper, which feeds under pressure a screw or piston injection device. It is preferable to use an injection device, such as that described in French patent Nos. 2,483,318 and 2,495,051.

The following examples make it possible to show the advantages provided by the invention.

EXAMPLE NO. 1

| Composition: | |
|---|---|
| unsaturated aromatic polyester | 17.00% |
| thermoplastic polymer | 11.00% |
| styrene | 0.65% |
| calcium carbonate | 50.00% |
| calcium stearate | 1.00% |
| tert-butyl perbenzoate | 0.25% |
| tert-butyl peroctoate | 0.10% |
| parabenzoquinone | 0.01% |
| glass fiber | |
| P 276 (13 mm) | 15.00% |
| P 279 (25 mm) | 5.00% |

The unsaturated aromatic polyester is marketed by the Bayer company under the designation "W 20". The polymer is marketed by the Union Carbide company under the designation "LP 40". P 276 is the reference of an insoluble lubricant whose formulation is described in U.S. Pat. No. 4,295,871; P 279 is the reference of a soluble lubricant whose formulation is described in French patent No. 2,398,702.

The composition was prepared as follows:

Into a container of sufficient capacity were successively introduced the polyester resin, styrene, catalysts and thermoplastic polymer. All these constituents were mixed with a stirrer with a high shearing rate for a few minutes.

Then the releasing agent and filler were successively introduced. The mixing operation was continued until a homogeneous paste was obtained which was then transferred into a kneader. The temperature of the paste being stabilized, the glass fibers coated with insoluble lubricant were introduced then, some moments later, the glass fibers coated with soluble lubricant were introduced, while continuing the kneading.

By way of example, a kneader with a useful volume of 150 liters was used to prepared about 80 kilograms of mixture. The total time of kneading of the paste and the two categories of glass fibers was for a time sufficient to form a homogenous yarn/resin dispersion: this generally takes up to 10 minutes. The mixture thus obtained was injected in a test mold defining a cavity of 360×180×3 mm. The molding temperature should be between 160° and 180° C.

Samples intended for measurements of mechanical strength were taken from the molded plate in two right-angle directions and led to the following values:

| | |
|---|---|
| bending strength (Standard NFT 51 001) | 80 to 90 MPa |
| modulus in flexure at beginning | 10500 to 11500 MPa |
| impact resistance (Standard NFT 51 035) | 0.5 to 0.7 J/cm$^3$ |

By way of comparison, the bending strength and the modulus of the samples made by injection of known mixtures were approximately identical, but their impact resistance was clearly less (between 0.3 and 0.4 J/cm$^3$).

EXAMPLE NO. 2

The material used was the same as that described in Example 1.

The piece obtained by injection molding, with a press able to exert a pressure of 2300 t, exhibited the following dimensions: 750×580×3 mm. It was a test piece representing a door panel of a motor vehicle. Samples taken from the piece led to the following mechanical strengths:

| | |
|---|---|
| bending strength | 79 MPa |
| modulus in flexure at beginning | 9460 MPa |
| Ultimate tensile strength (Standard NFT 51 034) | 32 MPa |
| impact resistance | 0.5 J/cm$^3$ |

EXAMPLE NO. 3

The material used was the same as that described in Example 1.

The piece obtained by injection with the press used in the preceding example was an automobile grill. Samples taken from the unit of the piece led to the following results:

| | |
|---|---|
| bending strength | 89 MPa |
| module in flexure | 11630 MPa |
| impact resistance | 0.53 J/cm$^3$ |

The impact resistance measured on an industrial piece from the known mixtures gave, on the average, an impact resistance of 0.3 J/cm$^3$.

EXAMPLE NO. 4

The material used was the same as that described in Example 1.

The part obtained by injection with the press already mentioned was a vehicle back louver. The samples were taken from the unit of the piece and led to the following results:

| | |
|---|---|
| bending strength | 76 MPa |
| module in flexure | 8200 MPa |
| impact resistance | 0.71 J/cm$^3$ |

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A moldable composition of polymerizable resins reinforced by cut yarns comprising: a resin component comprising: an unsaturated polyester, a thermoplastic polymer, a liquid monomer having at least one polymerizable reactive $CH_2=C<$ group per molecule, and an inert mineral filler; and reinforcement comprising cut yarns of single and multiple filaments of different lengths dipsersed throughout the resin, wherein the lengths of single filament yarn are longer than the lengths of multiple filament yarn.

2. The composition of claim 1 further comprising one or more of a thickening agent, a catalyst, and a releasing agent.

3. The composition of claim 1 wherein the proportion by weight of the short multiple filament yarn is greater than the proportion by weight of the long single filament yarn.

4. The composition of claim 3, wherein the ratio of proportions by weight of the single filament yarn to the multiple filament yarn is between about 0.6 and 0.7.

5. The composition of claim 1 wherein the yarn is glass fiber.

6. The composition of claim 4 wherein the short yarns comprise glass fiber yarn coated with an insoluble lubricant and the long yarns comprise glass fiber yarn coated with a soluble lubricant.

7. The composition of claim 4 wherein the constituents are present in the following weight limits:

| | |
|---|---|
| unsaturated polyester | 13 to 20% |
| thermoplastic polymer | 10 to 15% |
| monomer | 0.01 to 2% |
| inert mineral filler | 40 to 55% |
| cut glass yarns | 15 to 25%. |

8. The composition of claim 1 wherein the weight ratio of thermoplastic polymer to unsaturated polyester is between 0.5 and 0.8.

9. The composition of claim 1 wherein the unsaturated polyester has a molecular weight of between about 150 and 528 per carbon double bond.

10. A moldable composition of polymerizable resins reinforced by cut yarns comprising: an unsaturated polyester in an amount between about 13 and 20 weight percent, a thermoplastic polymer in an amount of between about 10 and 15 weight percent, a liquid monomer in an amount of between about 0.01 and 2 weight percent, an inert mineral filler in an amount of between about 40 and 55 weight percent; and cut glass yarns in an amount of between about 15 and 25 weight percent; wherein the cut yarns are of single and multiple filaments of different lengths with the single filaments being longer in length than the multiple filaments and wherein the amount of multiple filament yarn is greater than the amount of single filament yarn.

11. The composition of claim 10 wherein the short yarns comprise glass yarns coated with an insoluble lubricant and the long yarns comprise glass filaments coated with a soluble lubricant.

12. The composition of claim 10 wherein the weight ratio of thermoplastic polymer to unsaturated polyester is between 0.5 and 0.8.

13. A process for obtaining a moldable composition of polymerizable resins reinforced by cut yarns which comprises: mixing an unsaturated polyester, a thermoplastic polymer, a monomer liquid substance having at least one polymerizable reactive $CH_2=C<$ group per molecule, and an inert mineral filler to form a resin; mixing cut yarn coated with an insoluble lubricant to the resin to form a mixture; and mixing cut yarn coated with a soluble lubricant to the mixture to form a moldable composition.

14. The method of claim 11 which further comprises mixing one or more of a thickening agent, a catalyst, an inhibitor and a releasing agent into said resin prior to adding the cut yarn.

15. The method of claim 12 wherein the weight amount of insoluble lubricant treated yarn is greater than the soluble lubricant treated yarn.

16. The process of claim 13 wherein the weight ratio of thermoplastic polymer to unsaturated polyester is between about 0.5 and 0.8 and further wherein the molecular weight of the unsaturated polyester ranges from about 350 to 528 per carbon double bond.

17. The process of claim 13 which further comprises injection molding the moldable composition to form a reinforced composite article.

18. The process of claim 13 which further comprises compression molding the moldable composition to form a reinforced composite article.

19. A reinforced composite article of cut yarns obtained by compression or injection molding the composition of claim 1.

20. A reinforced composite article obtained by compression or injection molding of the composition claim 10.

* * * * *